(12) United States Patent
Sun

(10) Patent No.: US 9,541,109 B2
(45) Date of Patent: Jan. 10, 2017

(54) DOME STRUCTURE

(71) Applicant: Xiaoping Sun, Allen, TX (US)

(72) Inventor: Xiaoping Sun, Allen, TX (US)

( * ) Notice: Subject to any disclaimer, the term of this patent is extended or adjusted under 35 U.S.C. 154(b) by 0 days.

(21) Appl. No.: 14/827,960

(22) Filed: Aug. 17, 2015

(65) Prior Publication Data

US 2015/0354197 A1  Dec. 10, 2015

Related U.S. Application Data

(60) Division of application No. 14/314,552, filed on Jun. 25, 2014, now Pat. No. 9,151,306, which is a continuation-in-part of application No. 13/775,651, filed on Feb. 25, 2013, now Pat. No. 8,789,318.

(51) Int. Cl.
*E04B 7/08* (2006.01)
*F16B 5/00* (2006.01)
*E04H 9/14* (2006.01)
*E04B 1/32* (2006.01)

(52) U.S. Cl.
CPC ........... *F16B 5/0004* (2013.01); *E04B 1/3211* (2013.01); *E04H 9/14* (2013.01); *E04B 2001/3241* (2013.01); *E04B 2001/3247* (2013.01); *E04B 2001/3282* (2013.01); *E04B 2001/3294* (2013.01); *Y10T 403/28* (2015.01); *Y10T 403/44* (2015.01)

(58) Field of Classification Search
CPC ........ F16B 5/0004; E04H 9/14; E04B 1/3211; E04B 2001/3247; E04B 2001/3294; E04B 2001/3282; E04B 2001/3241; Y10T 403/44; Y10T 403/28

USPC .................................................. 52/81.3, 80.1
See application file for complete search history.

(56) References Cited

U.S. PATENT DOCUMENTS

| 3,309,121 A * | 3/1967 | Fentiman | E04B 1/1903 403/162 |
| 3,323,820 A * | 6/1967 | Braccini | E04B 7/105 403/218 |
| 4,280,521 A * | 7/1981 | Zeigler | E04B 1/1909 135/120.3 |
| 4,355,918 A * | 10/1982 | Van Vliet | E04B 1/1909 403/170 |

(Continued)

*Primary Examiner* — Basil Katcheves
(74) *Attorney, Agent, or Firm* — Na Xu; IPro, PLLC

(57) ABSTRACT

A connector is described herein. In an embodiment, a connector may comprises an upper wall, a lower wall, one or more outer circular walls and one or more inner circular walls; wherein one of the one or more outer circular walls is an extended part of the upper wall or the lower wall; wherein one of the one or more outer circular walls and one of the one or more inner circular walls are configured to form a circular slot between the outer circular wall and the inner circular wall; wherein the connector is configured to accommodate a plurality of ends of a plurality of planar panels in the circular slot to connect the plurality of planar panels. The connect further comprises a top connector piece and a bottom connector piece; wherein the top connector piece comprises the upper wall and one of the one or more inner circular walls; wherein the bottom connector piece comprises the lower wall and one of the one or more inner circular walls; wherein the top connector piece and the bottom connector piece are configured to be joined. In an embodiment, the connector is configured to facilitate the assembly of a dome structure.

5 Claims, 15 Drawing Sheets

(56) References Cited

U.S. PATENT DOCUMENTS

| | | | | |
|---|---|---|---|---|
| 4,974,986 A | * | 12/1990 | Cook | E04B 1/1906 403/141 |
| 5,797,695 A | * | 8/1998 | Prusmack | E04H 15/32 135/145 |
| 5,957,614 A | * | 9/1999 | Aurich | A47B 47/0025 248/243 |
| 5,996,288 A | * | 12/1999 | Aiken | E04B 1/3211 403/171 |
| 2003/0226319 A1 | * | 12/2003 | Richards | E04B 1/3211 52/80.1 |

* cited by examiner

DOME STRUCTURE

RELATED APPLICATIONS

This application is a divisional application of a pending U.S. application Ser. No. 14/314,552 filed on Jun. 25, 2014, which is a Continuation In Part application of a U.S. application Ser. No. 13/775,651 filed on Feb. 25, 2013 (U.S. Pat. No. 8,789,318), all of which are hereby incorporated by reference in their entirety.

BACKGROUND

Emergency shelters are structures built for residence and dwelling during or after a manmade or natural disaster, such as a fire, flood, tornado or earthquake. In some disasters such as tornadoes, survival depends heavily on the mechanical strength and quality of the emergency shelters. Temporary emergency shelters available on the market that are adaptable to individual use, such as inexpensive tents, lack the necessary strength, durable quality, and environmental conformability for survival during a natural disaster. Emergency shelters that overcome some of the disadvantages of temporary shelters are often built primarily for other purposes, such as schools, churches, gymnasiums, etc. They are more expensive and difficult to build, are not practical to be owned by a family, and are sometimes not available at a near distance to a person in need of survival during a disaster situation.

A spherical ball or a round ball is a three dimensional object that has a spherical surface, characterized as a perfectly round geometrical object in a three-dimensional space. A spherical surface has a set of points that are all the same distance, which is referred to as the radius of the sphere or r, from a given point in space. The given point is known as the center of the sphere. The shortest path connecting two points lying entirely in the sphere is a minor arc of the great circle passing the points. On a sphere, a central angle of an arc of a great circle is an angle spanned by the radii from each end of the arc to the center of the sphere. A plane section of a sphere is a circle. A great circle, also known as an orthodrome or Riemannian circle, of a sphere is the intersection of the sphere and a plane which passes through the center point of the sphere, as opposed to a general circle of a sphere where the plane is not required to pass through the center. A sphere may be divided into two equal hemispheres by any plane that passes through its center.

A spherical ball is unique in many ways. For instance, in comparison to other three dimensional objects, a spherical ball has the largest volume for the smallest surface area: the sphere has the smallest surface area among all surfaces enclosing a given volume and it encloses the largest volume among all closed surfaces with a given surface area.

For the reason above, a building structure made in resemblance to a sphere may have the benefit of lower consumption of construction materials, lower cost, more enclosed space for use, higher structural strength and better safety. Such a structure that resembles a hemisphere or the hollow upper half of a sphere is often referred to as a dome. Dome structures made of various materials have a long architectural lineage. Their prevalence in use has resulted in many types and variations, such as an onion dome, corbel dome, geodesic dome, oval dome, polygonal dome, sail dome, saucer dome, umbrella dome, etc.

SUMMARY

Described herein is a structure comprising a first spherical triangular unit, a second spherical triangular unit and a third spherical triangular unit; the first spherical triangular unit comprising a first planar panel, a second planar panel and a third planar panel; the second spherical triangular unit comprising a fourth planar panel, a fifth planar panel and a sixth planar panel; the third spherical triangular unit comprising a seventh planar panel, an eighth planar panel and a ninth planar panel; the first planar panel comprising a first end surface, the second planar panel comprising a second end surface, the third planar panel comprising a third end surface; the fourth planar panel comprising a fourth end surface, the fifth planar panel comprising a fifth end surface, and the sixth planar panel comprising a sixth end surface; the seventh planar panel comprising a seventh end surface, the eighth planar panel comprising an eighth end surface, and the ninth planar panel comprising a ninth end surface.

Wherein the first end surface comprises a minor arc of a first great circle of a sphere; wherein the second end surface comprises a minor arc of a second great circle of the sphere; wherein the third end surface comprises a minor arc of a third great circle of the sphere; wherein the fourth end surface comprises a minor arc of a fourth great circle of the sphere; wherein the fifth end surface comprises a minor arc of a fifth great circle of the sphere; wherein the sixth end surface comprises a minor arc of the third great circle of the sphere; wherein the seventh end surface comprises a minor arc of a seventh great circle of the sphere; wherein the eighth end surface comprises a minor arc of an eighth great circle of the sphere; wherein the ninth end surface comprises a minor arc of a ninth great circle of the sphere.

Wherein the seventh planar panel and the ninth planar panel join and form a corner of the third spherical triangular unit, the first planar panel and the second planar panel join and form a corner of the first spherical triangular unit, the corner of the first spherical triangular unit is connected to the corner of the third spherical triangular unit; and wherein the eighth planar panel and the ninth planar panel join and form another corner of the third spherical triangular unit, the fourth planar panel and the fifth planar panel join and form a corner of the second spherical triangular unit, the other corner of the third spherical triangular unit is connected to the corner of the second spherical triangular unit.

According to an embodiment of the structure, central angles of the first end surface, second end surface, third end surface, fourth end surface, fifth end surface and sixth end surface are essentially the same. As used herein, a central angle of an end surface comprising an arc is the central angle of the arc.

According to an embodiment of the structure, central angles of the seventh, eighth and ninth end surfaces are essentially the same.

According to an embodiment of the structure, the first planar panel extends from the first end surface toward a center of the sphere along a surface of the first great circle; the second planar panel extends from the second end surface toward the center of the sphere on a surface of the second great circle; and the third planar panel extends from the third end surface toward the center of the sphere on a surface of the third great circle.

According to an embodiment of the structure, the first planar panel extends from the first end surface to a first inner end surface which comprises arc concentric with the first end surface; wherein the second planar panel extends from the second end surface to a second inner end surface which comprises an arc concentric with the second end surface; wherein the third planar panel extends from the third end surface to a third inner end surface which comprises an arc concentric with the third end surface.

According to an embodiment of the structure, central angles of the first, second, and third inner end surfaces are essentially the same.

According to an embodiment of the structure, radii of the first, second, and third inner end surfaces are essentially the same.

According to an embodiment of the structure, the first and the second planar panel are joined by a hinge; the second and third planar panels are joined by a hinge; the first and third planar panels are joined by a hinge. Preferably, the hinge is a butt hinge.

According to an embodiment, the structure further comprises one or more intra-triangular-unit covers; the first, second and third planar panels comprise one or more inner ridges configured to accept or secure the one or more intra-triangular-unit covers, that are configured to fit into and cover an intra-unit opening of the first triangular unit.

According to an embodiment the structure further comprises one or more inter-triangular-unit covers; the first, second and third planar panels comprise one or more outer ridges configured to accept or secure the one or more inter-triangular-unit covers, that are configured to fit into and cover an inter-unit opening of adjacent spherical triangular units. According to an embodiment, the first, second and third spherical triangular units are adjacent spherical triangular units.

According to an embodiment, when there are two or more intra-triangular-unit covers, the structure further comprises a material filled between the two or more intra-triangular-unit covers.

According to an embodiment, when there are two or more inter-triangular-unit covers, the structure further comprises a material filled between the two or more inter-triangular-unit covers.

According to an embodiment, the structure further comprises a plurality of plates, configured to connect the first spherical triangular unit to the third spherical triangular unit and to connect the second spherical triangular unit to the third spherical triangular unit.

According to an embodiment, the structure further comprises a plurality of fasteners configured to join the plurality of plates to the first, second or third spherical triangular units through a plurality of through holes on the first, second and third spherical triangular units.

According to an embodiment of the structure, at least one of the plurality of fasteners comprises a ring configured to accept wiring therethrough.

According to an embodiment of the structure, at least one of the first, second and third planar panels comprise a material selected from a group consisting of aluminum, iron, steel, glass fiber, carbon fiber, plastic, wood and a combination thereof.

According to an embodiment of the structure, the ninth great circle passes through an intersection of the first end surface and the second end surface and passes through an intersection of the fourth end surface and the fifth end surface; wherein the ninth end surface is a minor arc of the ninth circle between the intersection of the first end surface and the second end surface and the intersection of the fourth end surface and the fifth end surface.

According to an embodiment, the structure further comprises a first plurality of spherical triangular units, each of which is essentially identical to the first spherical triangular unit; the second spherical triangular unit is essentially identical to the first spherical triangular unit; wherein the first plurality of spherical triangular units and the first and second spherical triangular units are essentially equally spaced radially along the third great circle, and constitute a first level of the structure.

According to an embodiment, the structure further comprises a second plurality of spherical triangular units, each of which is essentially identical to the third spherical triangular unit; wherein the second plurality of spherical triangular units and the third spherical triangular unit are essentially equally spaced radially along the ninth great circle, and constitute a second level of the structure.

According to an embodiment, the structure further comprises a plurality of levels comprising a plurality of spherical triangular units; the plurality of spherical triangular units on one level of the plurality of levels are essentially identical to each other, and are essentially equally spaced radially relative to a center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

According to an embodiment, the structure comprises a connector. The connector comprises an upper wall, a lower wall, one or more outer circular walls and one or more inner circular walls. One of the one or more outer circular walls is an extended part of the upper wall or the lower wall. One of the one or more outer circular walls and one of the one or more inner circular walls are configured to form a circular slot.

According to an embodiment, the inner and outer circular walls and the circular slots are in cylindrical shapes.

According to an embodiment, the inner and outer circular walls and the circular slots are in conical or funnel shapes.

According to an embodiment, the connector is configured to accommodate a plurality of ends of a plurality of planar panels in the circular slot to connect a plurality of spherical triangular units.

According to an embodiment, the connector connects an end of each of planar panels of three adjacent spherical triangular units to connect three adjacent spherical triangular units.

According to an embodiment, the connector comprises a top connector piece and a bottom connector piece. The top connector piece comprises an upper wall and an inner circular wall. The bottom connector piece comprises a lower wall and an inner circular wall. The top connector piece and the bottom connector piece are configured to be securely joined.

According to an embodiment, the top connector piece further comprises a first top handle and a second top handle; the bottom connector piece further comprises a first bottom handle and a second bottom handle.

According to an embodiment, the top connector piece comprises an internal thread; the bottom connector piece comprises an external thread. The top connector piece and the bottom connector piece are joined by the internal thread and the external thread.

According to an embodiment, the top connector piece comprises a top through hole in a center of the top connector piece; the bottom connector piece comprises a bottom through hole in a center of the bottom connector piece. The top through hole and the bottom through hole are configured to align to form a holding space.

According to an embodiment, the structure further comprises a control system, a power cable or system, a security system, an energy generation system, a heating system, a communication cable or system, a transmission cable or system, a food or water transit cable or system, a display or notification system, an alarm system, a speaker system, a battery system, an air conditioning system, a filtration system, a lighting system, or a device or a material that is adapted to provide for life and survival.

According to an embodiment, the structure further comprises a lighting device in the holding space.

According to an embodiment, the lighting device comprises a solar panel, a battery, a casing, and a LED light.

According to an embodiment, each end of a planar panel comprises a stem and a head. The head is configured to fit in the circular slot, and engaged by the upper wall, the lower wall and the inner and outer circular walls.

According to an embodiment, the structure further comprises a first plurality of spherical triangular units, each of which is essentially identical to the first spherical triangular unit; the second spherical triangular unit is essentially identical to the first spherical triangular unit; wherein the first plurality of spherical triangular units and the first and second spherical triangular units are essentially equally spaced radially along the third great circle, and constitute a first level of the structure.

According to an embodiment, the structure further comprises a second plurality of spherical triangular units, each of which is essentially identical to the third spherical triangular unit; wherein the second plurality of spherical triangular units and the third spherical triangular unit are essentially equally spaced radially relative to a center of the sphere, and constitute a second level of the structure.

According to an embodiment, the structure further comprises a plurality of spherical triangular units; the plurality of spherical triangular units on one level of the plurality of levels are essentially identical to each other, and are essentially equally spaced radially relative to a center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

Described herein is a connector which comprises an upper wall, a lower wall, one or more outer circular walls and one or more inner circular walls; wherein one of the one or more outer circular walls is an extended part of the upper wall or the lower wall. One of the one or more outer circular walls and one of the one or more inner circular walls are configured to form a circular slot between the outer circular wall and the inner circular wall. The connector is configured to accommodate a plurality of ends of a plurality of planar panels in the circular slot to connect the plurality of planar panels.

According to an embodiment, the connector further comprises a top connector piece and a bottom connector piece. The top connector piece comprises the upper wall and one of the one or more inner circular walls. The bottom connector piece comprises the lower wall and one of the one or more inner circular walls. The top connector piece and the bottom connector piece are configured to be joined.

According to an embodiment, the top connector piece further comprises a first top handle and a second top handle. The bottom connector piece further comprises a first bottom handle and a second bottom handle.

According to an embodiment, the top connector piece further comprises an internal thread; the bottom connector piece comprises an external thread. The top connector piece and the bottom connector piece are joined by the internal thread and the external thread.

According to an embodiment, the top connector piece further comprises a top through hole in a center of the top connector piece. The bottom connector piece comprises a bottom through hole in a center of the bottom connector piece; wherein the top through hole and the bottom through hole are aligned to form a holding space.

According to an embodiment, the connector further comprises a lighting device in the holding space. The lighting device comprises a solar panel, a battery, a casing, and a LED light.

Described herein is an apparatus comprising said connector.

According to an embodiment, the apparatus is a toy, a game, a model or a tool.

DETAILED DESCRIPTION

Figure 1:
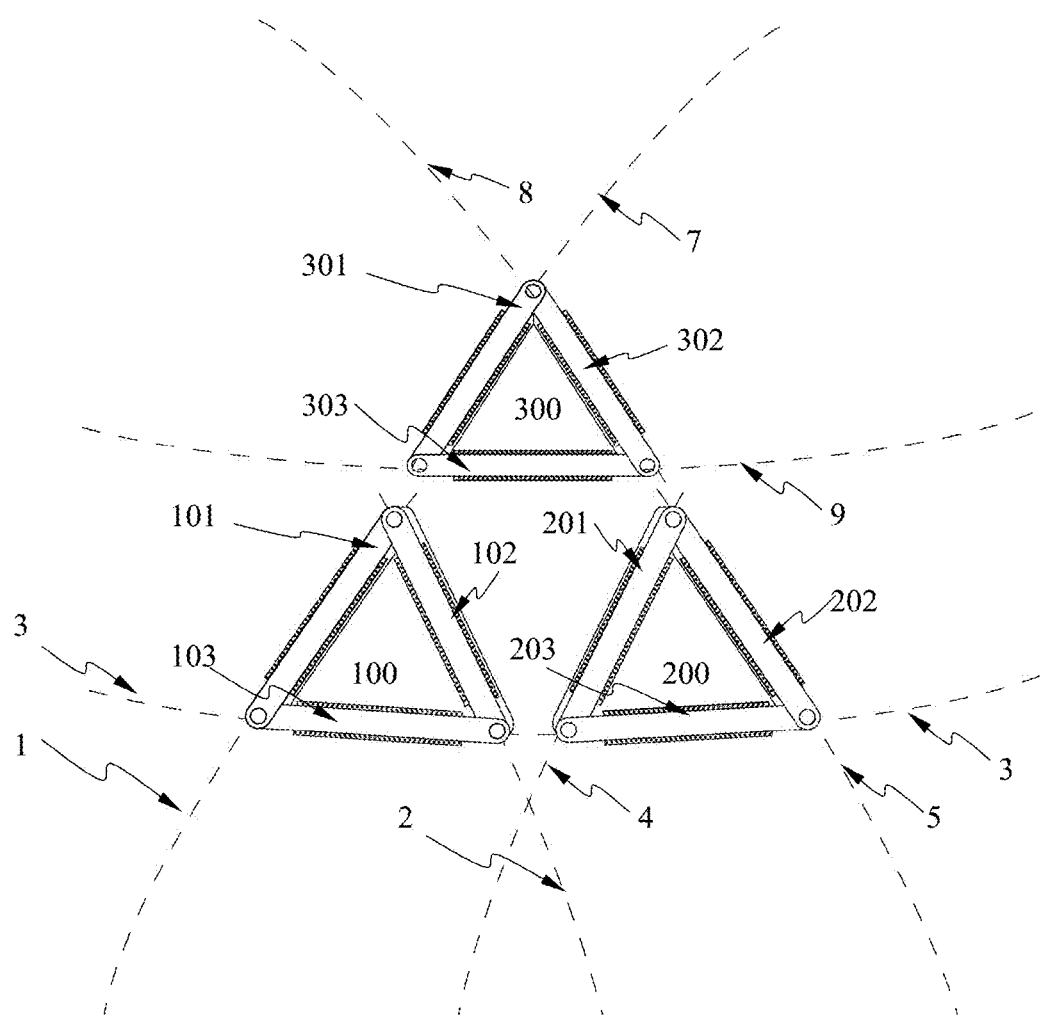
FIG. 1 shows an embodiment of the structure showing a first spherical triangular unit, a second spherical triangular unit and a third spherical triangular unit.

According to an embodiment as shown in FIG. 1, a structure comprises a first spherical triangular unit 100, a second spherical triangular unit 200 and a third spherical triangular unit 300. The first spherical triangular unit 100 comprises a first planar panel 110, a second planar panel 120 and a third planar panel 130; the second spherical triangular unit comprises a fourth planar panel 210, a fifth planar panel 220 and a sixth planar panel 230; the third spherical triangular unit comprises a seventh planar panel 310, an eighth planar panel 320 and a ninth planar panel 330.

The first planar panel 110 comprises a first end surface 101, the second planar panel 120 comprises a second end surface 102, the third planar panel 130 comprises a third end surface 103; the fourth planar panel 210 comprises a fourth end surface 201, the fifth planar panel 220 comprises a fifth end surface 202, and the sixth planar panel 230 comprises a sixth end surface 203; the seventh planar panel 310 comprises a seventh end surface 301, the eighth planar panel 320 comprises an eighth end surface 302, and the ninth planar panel 330 comprises a ninth end surface 303.

Figure 10:
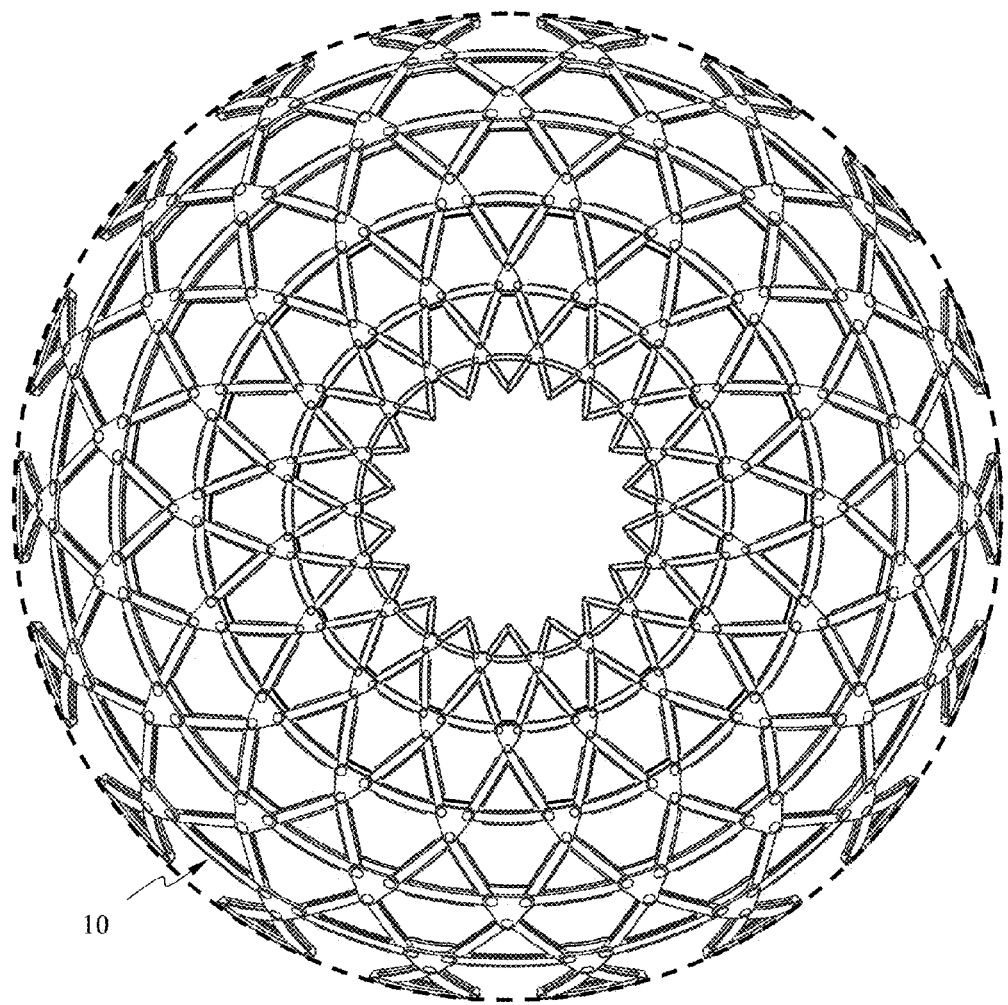
FIG. 10 is a top view of the structure being a multiple level dome, according to an embodiment.

The first end surface 101 comprises a minor arc of a first great circle 1 of a sphere 10 (see FIG. 10). The second end surface 102 comprises a minor arc of a second great circle 2 of the sphere 10. The third end surface 103 comprises a minor arc of a third great circle 3 of the sphere 10. The fourth end surface 201 comprises a minor arc of a fourth great circle 4 of the sphere 10. The fifth end surface 202 comprises a minor arc of a fifth great circle of 5 the sphere 10. The sixth end surface 203 comprises a minor arc of the third great circle 3 of the sphere 10. The seventh end surface 301 comprises a minor arc of a seventh great circle 7 of the sphere 10. The eighth end surface 302 comprises a minor arc of an eighth great circle 8 of the sphere 10. The ninth end surface 303 comprises a minor arc of a ninth great circle 9 of the sphere 10.

Wherein the seventh planar panel 301 and the ninth planar panel 303 join and form a corner of the third spherical triangular unit 300; the first planar panel 101 and the second planar panel 102 join and form a corner of the first spherical triangular unit 100; the corner of the first spherical triangular unit 100 is connected to the corner of the third spherical triangular unit 300. Wherein the eighth planar panel 302 and the ninth planar panel 303 join and form another corner of the third spherical triangular unit 300, the fourth planar panel 201 and the fifth planar panel 202 join and form a corner of the second spherical triangular unit 200, the other corner of the third spherical triangular unit 300 is connected to the corner of the second spherical triangular unit 200.

As shown in FIG. 1, central angles of the first end surface, second end surface, third end surface, fourth end surface, fifth end surface and sixth end surface are essentially the same.

As shown in FIG. 1, central angles of the seventh, eighth and ninth end surfaces are essentially the same.

Figure 2:
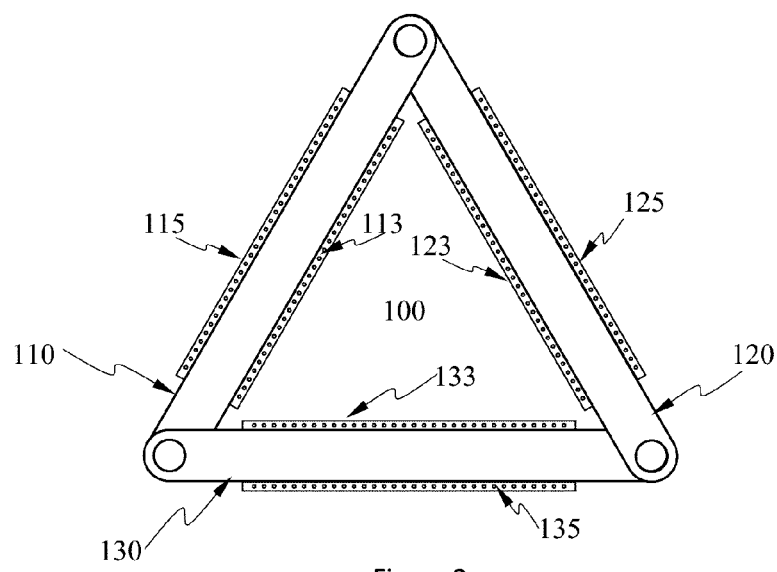
FIG. 2 is a front view of the first spherical triangular unit in the structure according to an embodiment.
Figure 3:
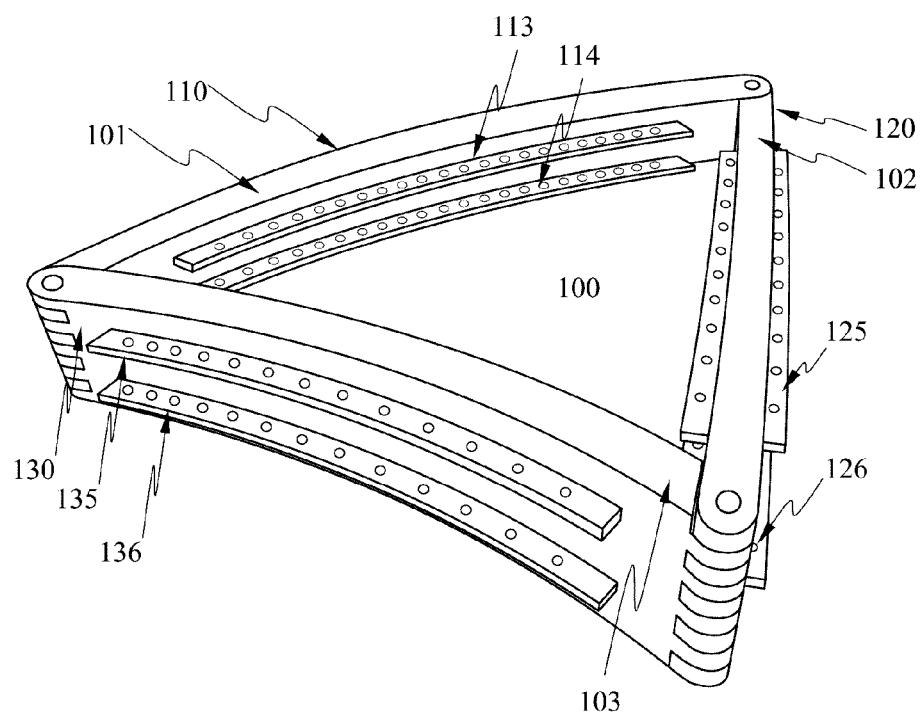
FIG. 3 is a perspective view of the first spherical triangular unit in the structure according to an embodiment.

As shown in FIGS. 2-4, the first planar panel 110 extends from the first end surface 101 toward a center of the sphere along a surface of the first great circle; the second planar panel 120 extends from the second end surface 102 toward the center of the sphere on a surface of the second great circle; and the third planar panel 130 extends from the third end surface 103 toward the center of the sphere on a surface of the third great circle.

As shown in FIG. 1, the ninth great circle passes through an intersection of the first end surface and the second end surface and passes through an intersection of the fourth end surface and the fifth end surface; wherein the ninth end surface is a minor arc of the ninth great circle between the intersection of the first end surface and the second end surface and the intersection of the fourth end surface and the fifth end surface.

Figure 4A:
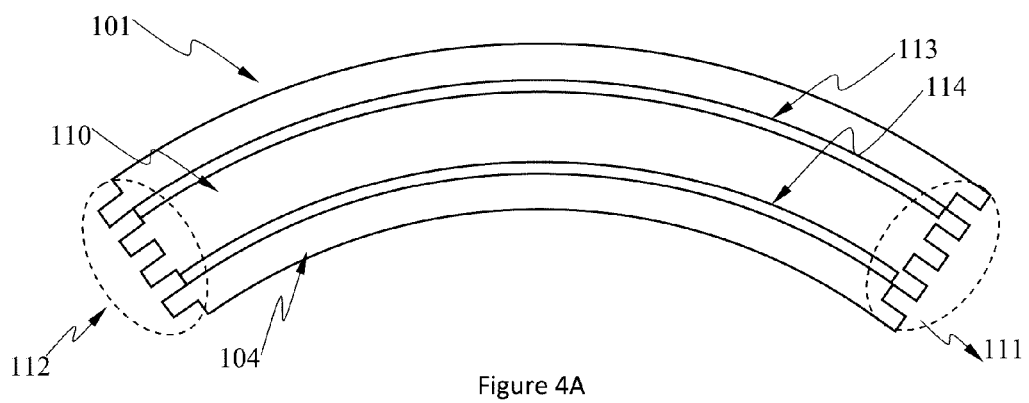
FIG. 4A is a bottom view of the first planar panel of the first spherical triangular unit.
Figure 4B:
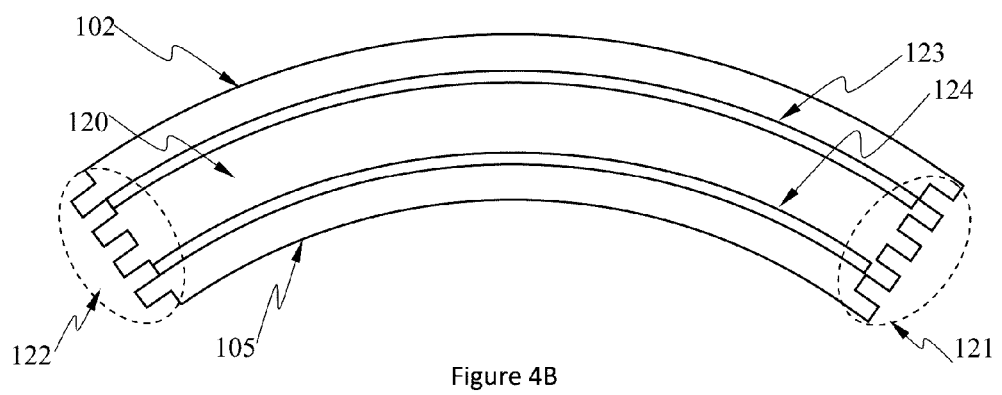
FIG. 4B is a bottom view of the second planar panel of the first spherical triangular unit.
Figure 4C:
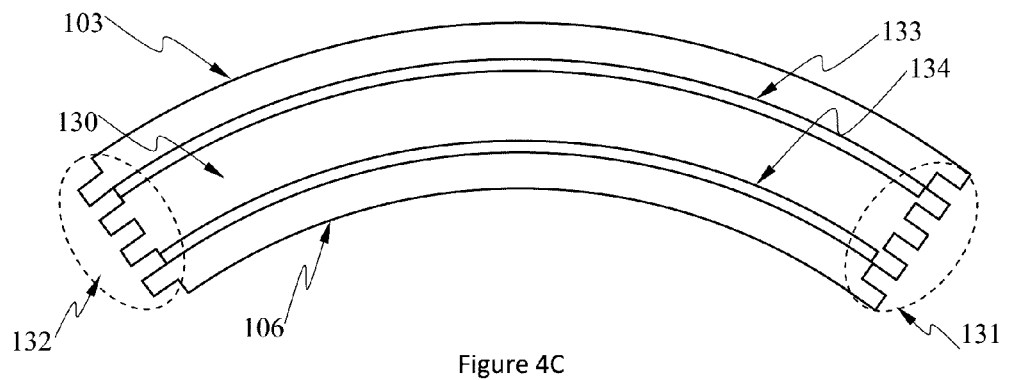
FIG. 4C is a bottom view of the third planar panel of the first spherical triangular unit.
Figure 4D:
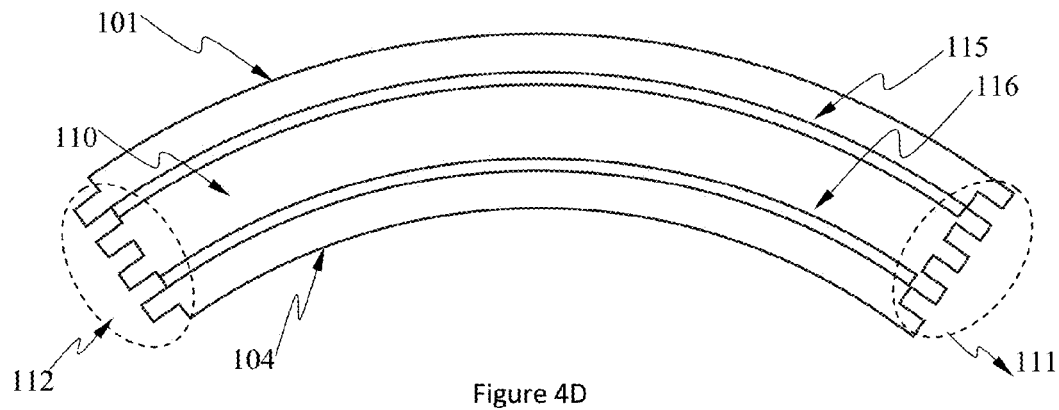
FIG. 4D is a top view of the first planar panel of the first spherical triangular unit.
Figure 4E:
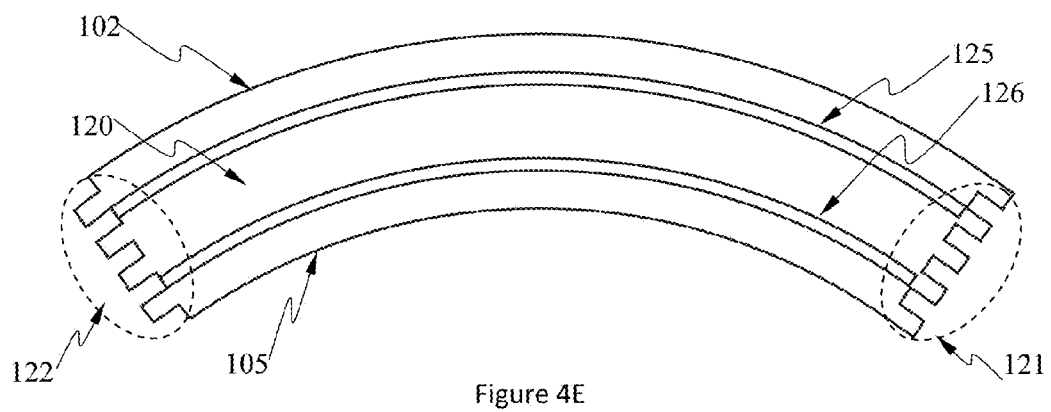
FIG. 4E is a top view of the second planar panel of the first spherical triangular unit.
Figure 4F:
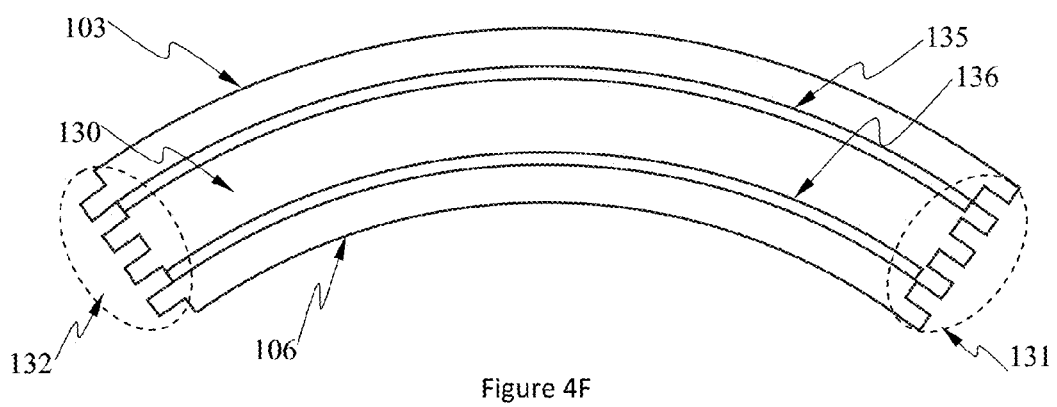
FIG. 4F is a top view of the third planar panel of the first spherical triangular unit.
Figure 4G:
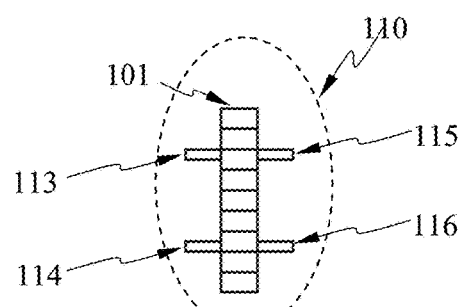
FIG. 4G is a side view of the first planar panel of the first spherical triangular unit.
Figure 4H:
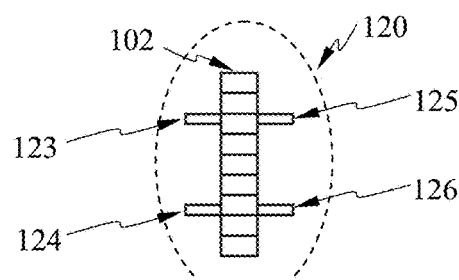
FIG. 4H is a side view of the second planar panel of the first spherical triangular unit.
Figure 4I:
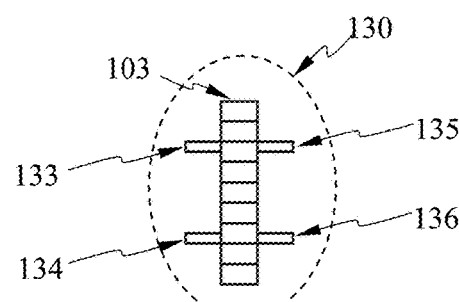
FIG. 4I is a side view of the third planar panel of the first spherical triangular unit.

As shown in FIG. 4A, the first planar panel 110 extends from the first end surface 101 to a first inner end surface 104 which is comprises an arc concentric with the first end surface 101; as shown in FIG. 4B, the second planar panel 120 extends from the second end surface 102 to a second inner end surface 105 which comprises an arc concentric with the second end surface 102; as shown in FIG. 4C, the third planar panel 130 extends from the third end surface 103 to a third inner end surface 106 which is comprises an arc concentric with the third end surface.

According to an embodiment of the structure, central angles of the first inner end surface 104, second inner end surface 105, and third inner end surface 106 are essentially the same.

According to an embodiment of the structure, radii of the first inner end surface 104, second inner end surface 105, and third inner end surface 106 are essentially the same.

As shown in FIG. 4A, the first planar panel 110 comprises a hinge 111 on a first end of the first planar panel, and a hinge 112 on a second end of the first planar panel; as shown in FIG. 4B, the second planar panel 120 comprises a hinge 121 on a first end of the second planar panel, and a hinge 122 on a second end of the second planar panel; as shown in FIG. 4C, the third planar panel 130 comprises a hinge 131 on a first end of the third planar panel, and a hinge 132 on a second end of the third planar panel. Preferably, all the hinges are butt hinges.

As shown in FIGS. 2-3, the first and the second planar panel are joined by a hinge 111 with a hinge 122; the second and third planar panels are joined by a hinge 121 with a hinge 132; the first and third planar panels are joined by a hinge 112 with a hinge 131. Preferably, all the hinges are butt hinges.

Figure 4J:
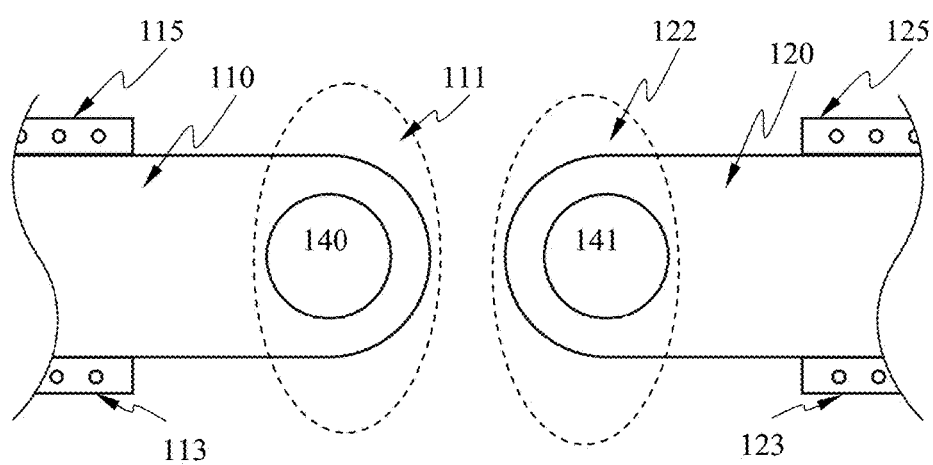
FIG. 4J is a front view of the first and second planar panel of the first spherical triangular unit.

As shown in FIGS. 2-3 and FIG. 4J, the hinges comprise through holes configured to allow two adjoining hinges to be secured together by a fastener. As shown in FIGS. 2-3, when adjoining hinges of three planar panels are aligned and the through holes of the two adjoining hinges are secured together, three planar panels are assembled into a spherical triangular unit. Preferably, as shown in FIG. 4J, a through hole 140 of the hinge 111 and a through hole 141 of the hinge 122 are essentially the same in size.

According to an embodiment of the structure, at least one of the first, second and third planar panels comprise a material selected from a group consisting of aluminum, iron, steel, glass fiber, carbon fiber, plastic, wood and a combination thereof.

As shown in FIGS. 2-5, the first, second and third planar panels comprise one or more inner ridges configured to accept or secure one or more intra-triangular-unit covers 150 that are configured to fit into and cover an intra-unit opening of the first triangular unit.

As shown in FIGS. 2-5, the first, second and third planar panels comprise one or more outer ridges configured to accept or secure one or more inter-triangular-unit covers 151 that are configured to fit into and cover an inter-unit opening of adjacent spherical triangular units.

According to an embodiment, when there are two or more intra-triangular-unit covers, the structure further comprises a material filled between the two or more intra-triangular-unit covers. The material is preferably intended for use in thermal insulation, mechanical enforcement, fire prevention, noise reduction, vibration reduction or a combination thereof.

According to an embodiment, when there are two or more inter-triangular-unit covers, the structure further comprises a material filled between the two or more inter-triangular-unit covers. The material is preferably intended for use in thermal insulation, mechanical enforcement, fire prevention, noise reduction, vibration reduction or a combination thereof.

Preferably, as shown in FIGS. 2-4, each planar panel comprises two inner ridges on a surface of the planar panel facing an inside of a spherical triangular unit assembled from the planar panel and two additional planar panels; each planar panel further comprises two outer ridges on a surface of the planar panel facing an outside of the spherical triangular unit assembled from the planar panel and two additional planar panels.

FIG. 3 is a perspective view showing the assembled first triangular unit according to an embodiment. FIG. 4 shows the planar panels 110, 120 and 130 of the first triangular unit comprising inner and outer ridges. As shown in FIG. 3, FIG. 4A, 4D, 4G the first planar panel 110 comprises inner ridges 113 and 114 on a surface of the first planar panel facing inside the first triangular unit when assembled, and comprises outer ridges 115 and 116 on a surface of the first planar panel facing an outside the first triangular unit when assembled. As shown in FIG. 3 and FIGS. 4B, 4E, 4H, the second planar panel 120 comprises inner ridges 123 and 124 on a surface of the second planar panel facing the inside the first triangular unit when assembled, and comprises outer ridges 125 and 126 on a surface of the second planar panel facing the outside the first triangular unit when assembled. As shown in FIG. 3 and FIGS. 4C, 4F, 4I, the third planar panel 130 comprises inner ridges 133 and 134 on a surface of the third planar panel facing the inside the first triangular unit when assembled, and comprises outer ridges 135 and 136 on a surface of the third planar panel facing outside the first triangular unit when assembled.

In FIGS. 4A-B, an inner ridge or an outer ridge is concentric to an end surface of a planar panel that comprises such inner ridge or outer ridge. According to an embodiment as shown in FIG. 4A, two inner ridges 113 and 114 of the first planar panel 110 are concentric to the first end surface 101; as shown in FIG. 4B, two inner ridges 123 and 124 of the second planar panel 120 are concentric to the second end surface 102; as shown in FIG. 4C, two inner ridges 133 and 134 of the third planar panel 130 are concentric to the third end surface 103.

Figure 5:
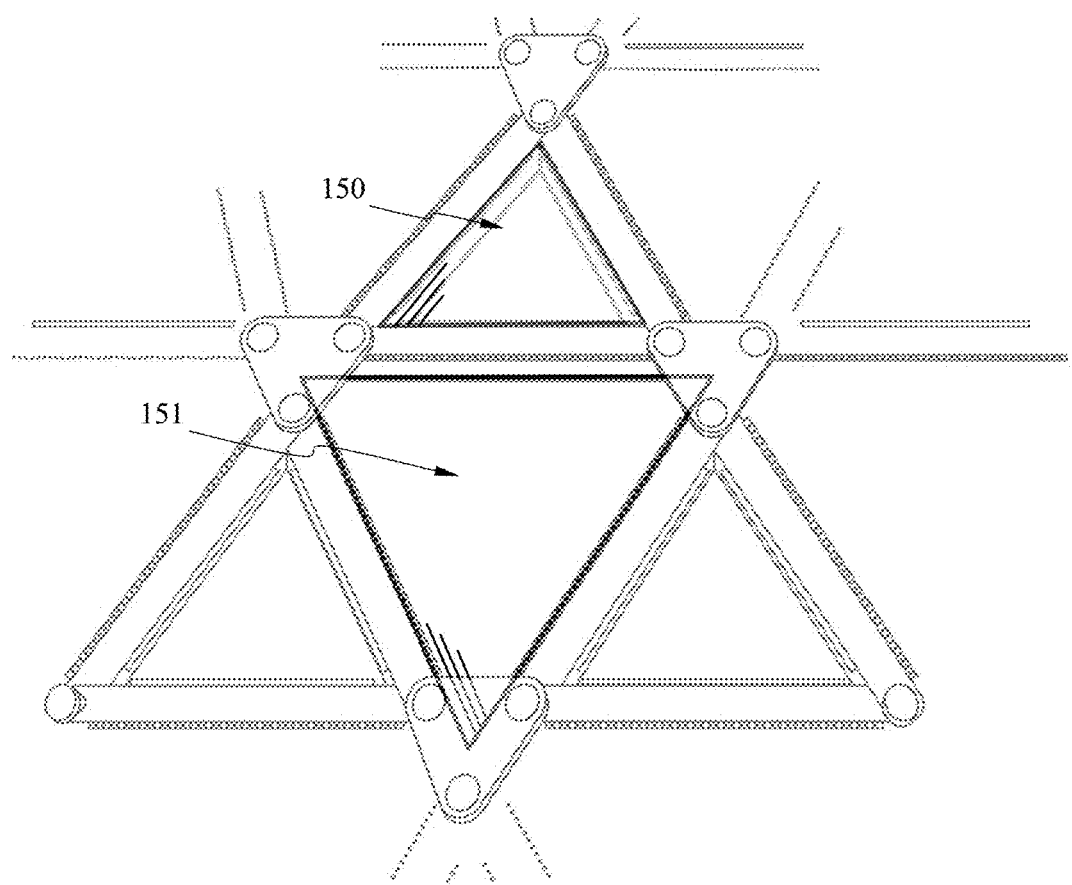
FIG. 5 shows an intra-triangular-unit cover and an inter-triangular cover according an embodiment.

As shown in FIG. 5, preferably, the ridges comprise a series of through holes along a direction that is substantially perpendicular to an end surface of a planar panel comprising such ridges. The through holes on the ridges are configured to accept or secure an intra- or inter-triangular-unit cover to the ridges.

As shown in FIGS. 5-8, the structure further comprises a plurality of plates, configured to connect the first spherical triangular unit to the third spherical triangular unit, and to connect the second spherical triangular unit to the third spherical triangular unit.

As shown in FIGS. 5-8, the structure further comprises a plurality of fasteners configured to join a plurality of plates to the first, second or third spherical triangular units through a plurality of through holes on the first, second or third spherical triangular units. At least one of the plurality of fasteners comprises a ring configured to accept wiring therethrough.

Figure 6:
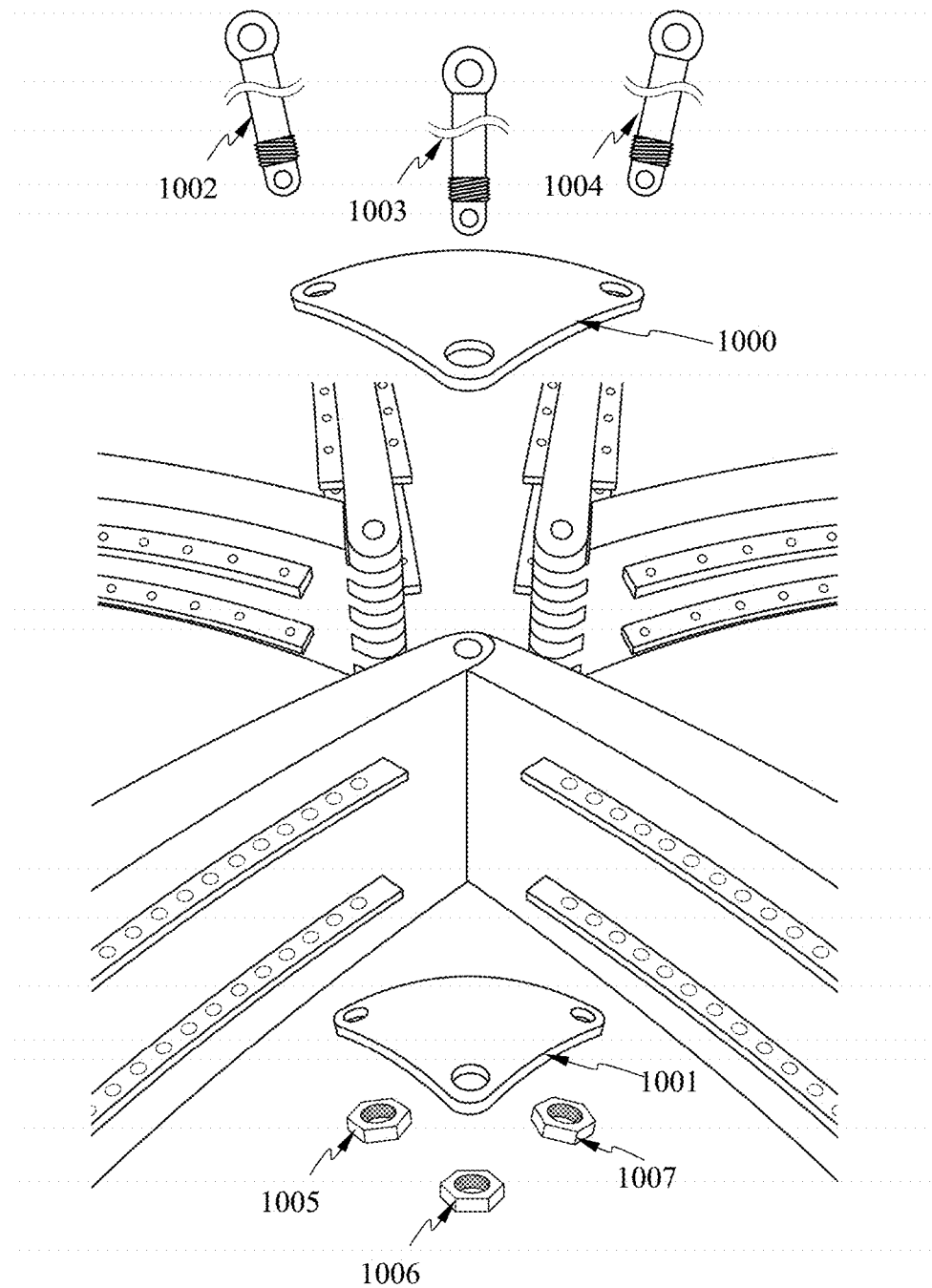
FIG. 6 is an explosion view of interconnection of three spherical triangular units of the structure according to an embodiment.
Figure 7:
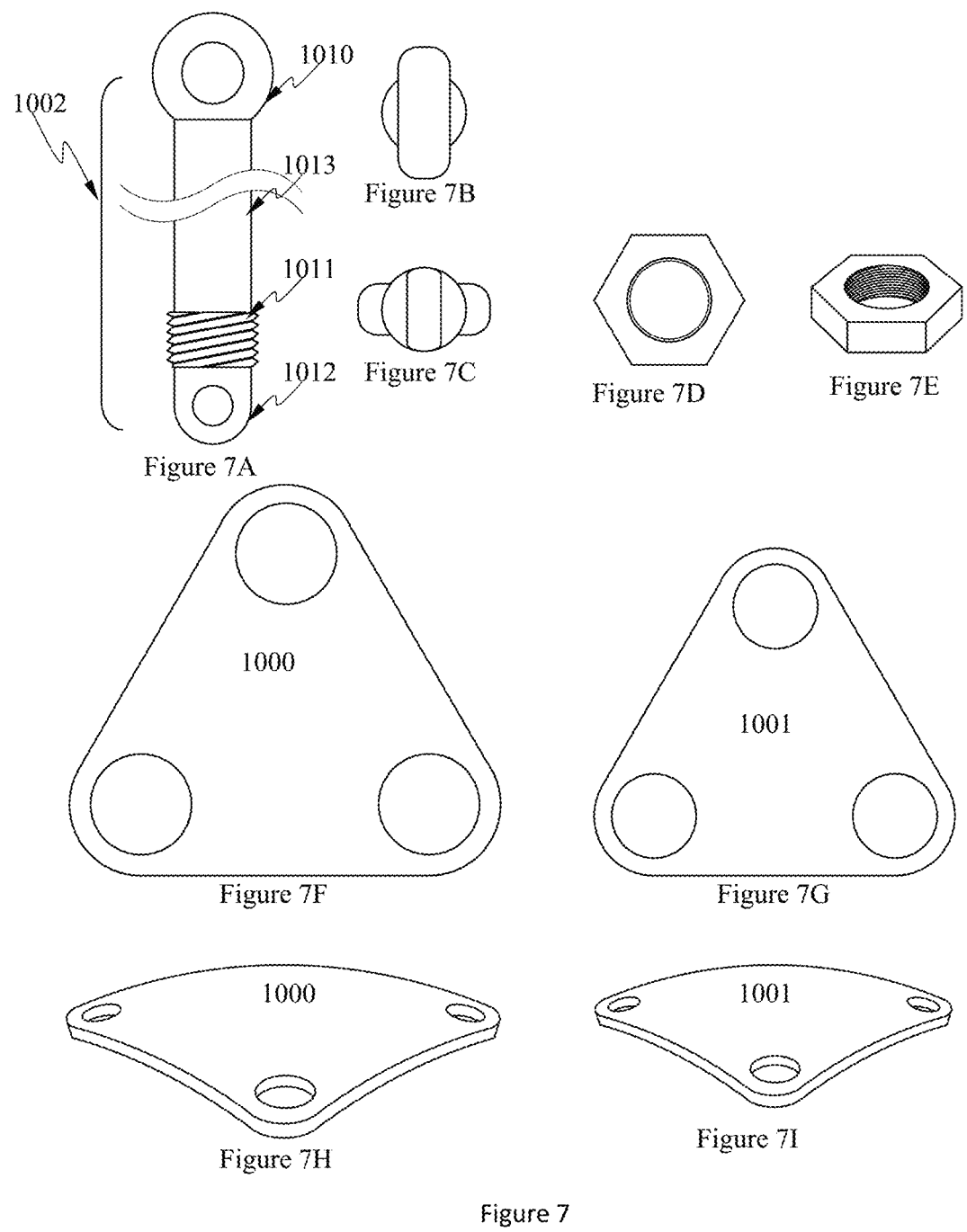
FIG. 7A is a side view of an embodiment of a fastener.
FIG. 7B is a front view of an embodiment of the fastener as shown in 7A.
FIG. 7C is a rear view of an embodiment of the fastener as shown in 7A.
FIG. 7D is a front view of an embodiment of a nut.
FIG. 7E is a perspective view of an embodiment of the nut as shown in 7D.
FIG. 7F is a front view of an embodiment of an outer plate.
FIG. 7G is a front view of an embodiment of an inner plate.
FIG. 7H is a perspective view of an embodiment of the outer plate as shown in 7F.
FIG. 7I is a perspective view of an embodiment of the inner plate as shown in 7G.
Figure 8A:
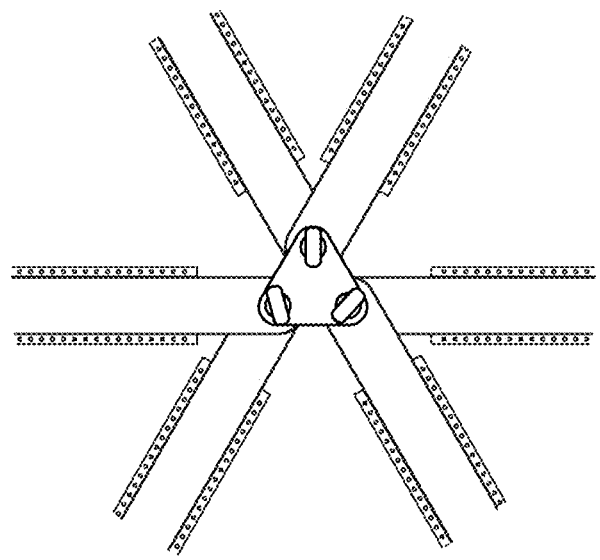
FIG. 8A is a front view of an interconnected portion of three spherical triangular units.
Figure 8B:
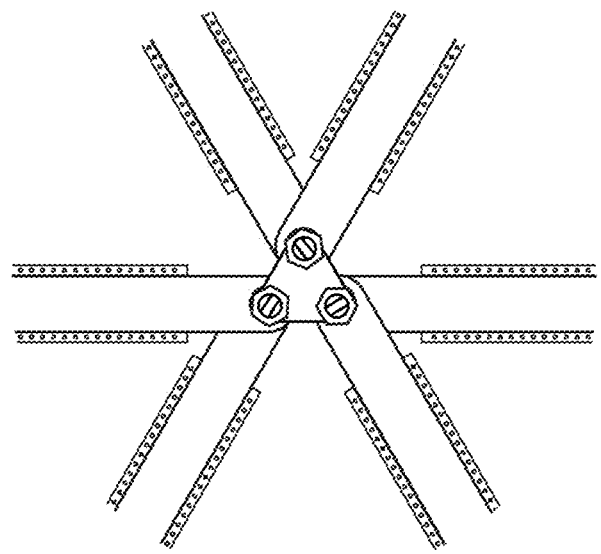
FIG. 8B is a back view of the interconnected portion of three spherical triangular units in 8A.

FIG. 6 is an explosion view of a portion of an embodiment showing interconnection of three spherical triangular units through a plurality of plates and fasteners. FIG. 8A is a top view according to the embodiment. FIG. 8B is a bottom view according to the embodiment. As shown in FIG. 6, three spherical triangular units are configured to be interconnected together through three adjoining corners by an outer plate 1000, an inner plate 1001, fasteners 1002, 1003, 1004 and nuts 1005, 1006 and 1007.

As shown in FIGS. 6, 7F and 7H, the outer plate 1000 is a substantially triangular shaped plate with smooth corners, with one through holes at each smooth corner. The outer plate 1000 comprises a surface contour that substantially conforms to the corresponding contact surface of the adjoining three spherical triangular units to be interconnected. The outer plate 1000 contacts hinge portions of the end surfaces of the three spherical triangular units to be interconnected.

As shown in FIGS. 6, 7G and 7I, the inner plate 1001 is a substantially triangular shaped plate with smooth corners, with one through hole at each smooth corner. The inner plate 1001 comprises a surface contour that substantially conforms to the corresponding contact surface of the adjoining three spherical triangular units to be interconnected. The inner plate 1001 contacts hinge portions of the inner end surfaces of the three spherical triangular units to be interconnected.

As shown in FIGS. 6 and 8, three through holes of the outer plate 1000 are configured to be aligned with through holes of the hinges of three spherical triangular units, and with the three through holes of the inner plate 1001. Such a configuration allows the securing of the aligned outer plate 1000, three spherical triangular units and the inner plate 1001 by fasteners. Through the connection with the two plates one on each side of three triangular units, three triangular units are interconnected together securely.

As shown in FIGS. 6 and 7A, fasteners 1002, 1003 and 1004 are essentially the same. A fastener may comprise a ring on an end configured to accept wiring therethrough. Such wirings are useful for attaching additional elements to the structure. Such an element may comprise a surface covering material, such as to provide additional functions in thermal insulation, water resistance, heat tolerance, mechanical reinforcement, etc.

As shown in FIG. 7A, a fastener 1002 comprises a first ring 1010 on an end, a threaded portion 1011, a non-threaded portion 1013, and a second ring 1012 on another end. Both rings 1010 and 1012 are configured to accept wirings therethrough. The threaded portion 1011 is configured to accept a matching nut 1005. The width of the threaded portion 1011, the unthreaded portion 1013 and the second ring 1012 are substantially the same, and are substantially the same as the inner width of the through holes of the hinges of a spherical triangular unit to be interconnected, and the inner width of the through holes of the inner plate 1001. The width of the first ring 1010 is substantially larger than the width of the unthreaded portion, and the width of the through holes of the outer plate 1000.

As shown in FIGS. 6 and 8B, nuts 1005, 1006 and 1007 are respectively connected to a fastener on its threaded portion, to complete the interconnection of three spherical triangular units. As shown in FIGS. 6, 7D and 7E, nuts 1005, 1006 and 1007 are essentially the same, and each of the nuts has an inner diameter that is substantially the same as the diameter of a threaded portion of a matching fastener.

Figure 9:
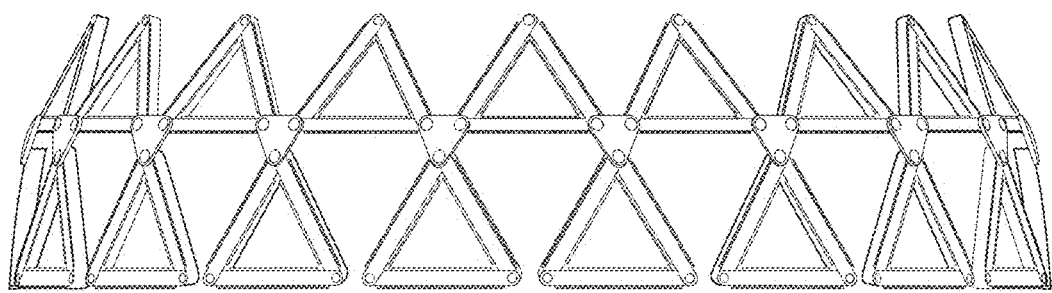
FIG. 9 is a front view of a first level and a second level of the structure according to an embodiment.

As shown in FIG. 9, the structure further comprises a first plurality of spherical triangular units, each of which is essentially identical to the first spherical triangular unit; the second spherical triangular unit is essentially identical to the first spherical triangular unit; the first plurality of spherical triangular units and the first and second spherical triangular units are essentially equally spaced radially along the third great circle, and constitute a first level of the structure.

As shown in FIGS. 9-10, the structure further comprises a second plurality of spherical triangular units, each of which is essentially identical to the third spherical triangular unit; wherein the second plurality of spherical triangular units and the third spherical triangular unit are essentially equally spaced radially relative to a center of the sphere 10 (see FIG. 10), and constitute a second level of the structure.

Figure 11:
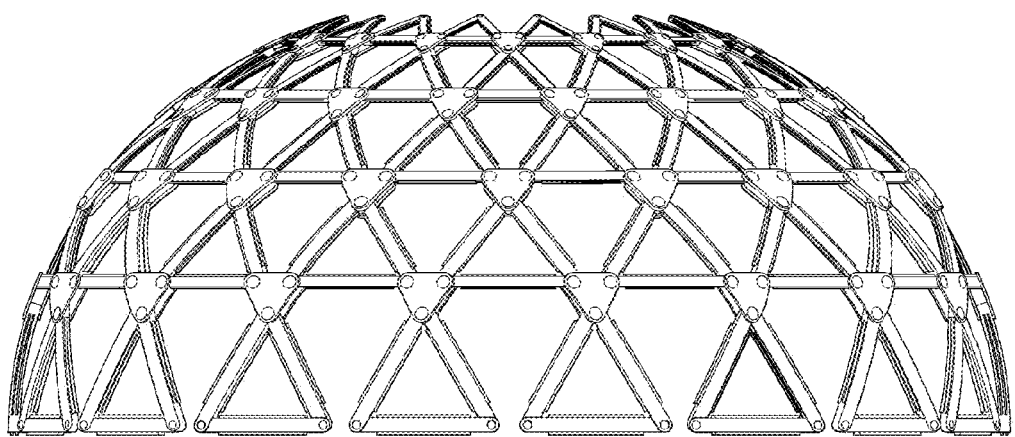
FIG. 11 is a front view of the structure being a multiple level dome, according to an embodiment.

According to embodiments in FIGS. 10-11, the structure further comprises a plurality of levels comprising a plurality of spherical triangular units; the plurality of spherical triangular units on one level of the plurality of levels are essentially identical to each other, and are essentially equally spaced radially relative to the center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

According to embodiments as shown in FIGS. 10 and 11, the structure essentially forms a dome structure. The structure has essentially a spherical surface that matches the sphere 10. The number of structural units, i.e. the spherical triangular units, on each level of the structure may be adjusted. Increasing the number of the spherical triangular units will increase the density and the mechanical strength of the overall structure. The number of the spherical triangular units may be designed with consideration of mechanical strength, usefulness and practicality, thereby allowing building dome structures of different overall sizes.

The design of inner or inter-triangular-unit covers substantially completes the look and function of the dome structure. According to an embodiment, inner or inter-triangular-unit covers may comprise surface contour that substantially conform to a portion of the surface of the sphere 10, such that the dome structure extremely approximates an ideal hemisphere surface of the sphere.

According to an embodiment as shown in FIGS. 12-15, the structure comprises a connector 2000. As shown in FIG. 12, the connector comprises an upper wall 2001, a lower wall 2002, one or more outer circular walls 2003 and one or more inner circular walls 2004. One of the one or more outer circular walls 2003 is an extended part of the upper wall 2001 or the lower wall 2002. One of the one or more outer circular walls 2003 and one of the one or more inner circular walls 2004 are configured to form a circular slot 2005 between the outer circular wall and the inner circular wall.

According to an embodiment, the inner and outer circular walls and the circular slots are in cylindrical shapes.

According to an embodiment, the inner and outer circular walls and the circular slots are in conical or funnel shapes.

Figure 14:
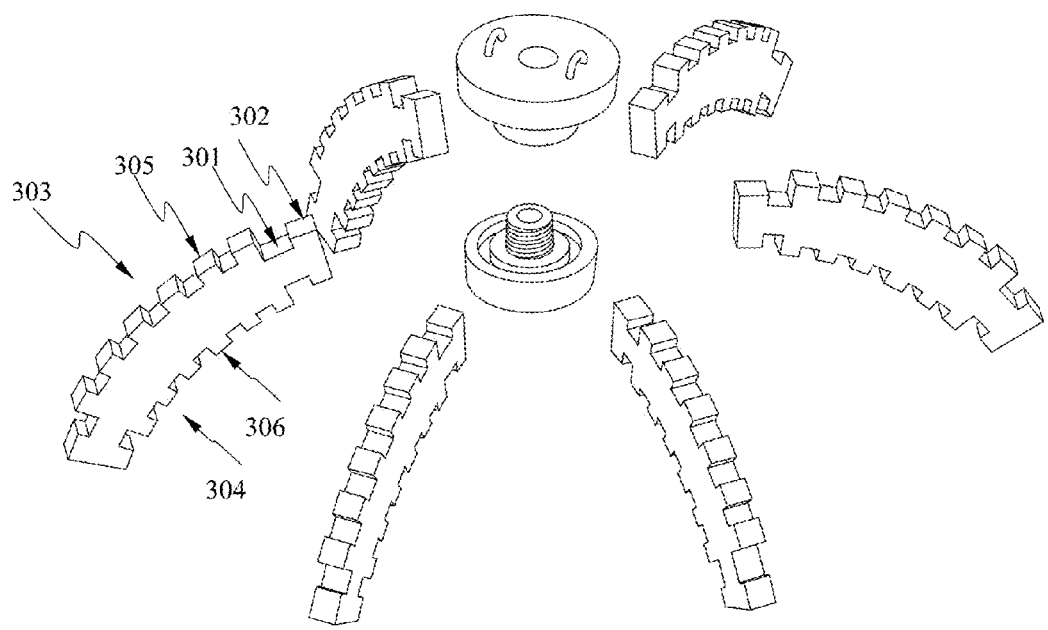
FIG. 14 is an explosion view of interconnection of three spherical triangular units of the structure according to an embodiment.
Figure 15:
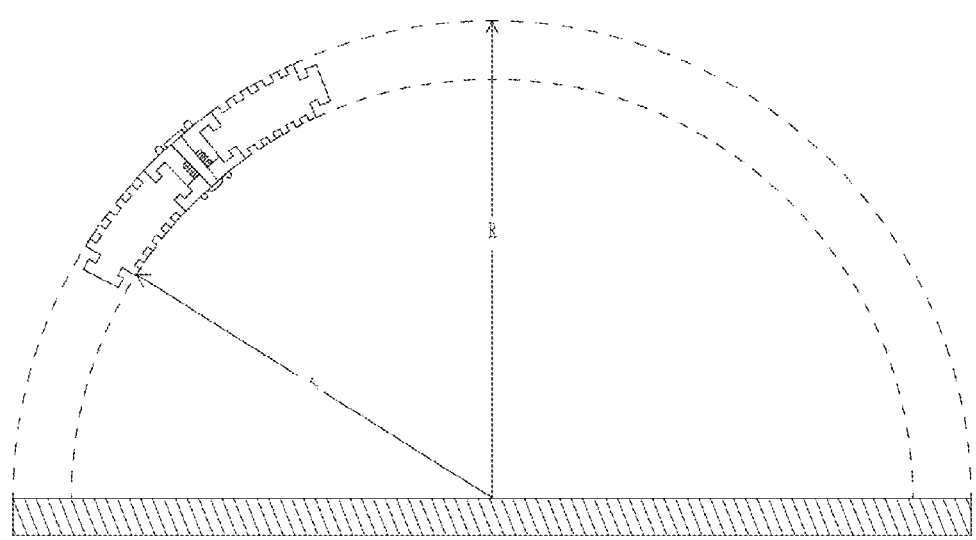
FIG. 15 is a cross-sectional view of the dome structure according to an embodiment.

According to an embodiment as shown in FIGS. 14-15, the connector 2000 is configured to accommodate a plurality of ends of a plurality of planar panels in the circular slot to connect a plurality of spherical triangular units.

Preferably, the connector is configured to connect each end of the planar panels of three spherical triangular units in the circular slot.

Preferably, as shown in FIG. 14-15, each end of a planar panel comprises a stem 301 and a head 302. The head is configured to fit in the circular slot 2005, and engaged by the upper wall, the lower wall and the inner and outer circular walls.

According to an embodiment as shown in FIG. 14-15, each planar panel extends from an end surface 303 to an inner end surface 304, which comprises an arc concentric with the end surface 303. Each planar panel comprises an array of protrusions 305 along the end surface 303 and an array of protrusions 306 along the inner end surface 304.

According to an embodiment as shown in FIG. 15, the dome structure has an enclosed inner hemispherical space with a diameter "r". The inner end surfaces of planar panels of all spherical triangular unites are arranged at a distance "r" from a center of the dome structure; the end surfaces of planar panels of all spherical triangular unites are arranged at a distance R from a center of the dome structure.

According to an embodiment as shown in FIG. 12, the connector 2000 comprises a top connector piece 2010 and a bottom connector piece 2020. The top connector piece 2010 comprises an upper wall 2001 and an inner circular wall 2004. The bottom connector piece 2020 comprises a lower wall 2002 and an inner circular wall 2004. The top connector piece 2010 and the bottom connector piece 2020 are configured to be securely joined.

Preferably, the upper wall is toward the exterior of the dome, and the lower wall is toward the interior of the dome.

Figure 12A:
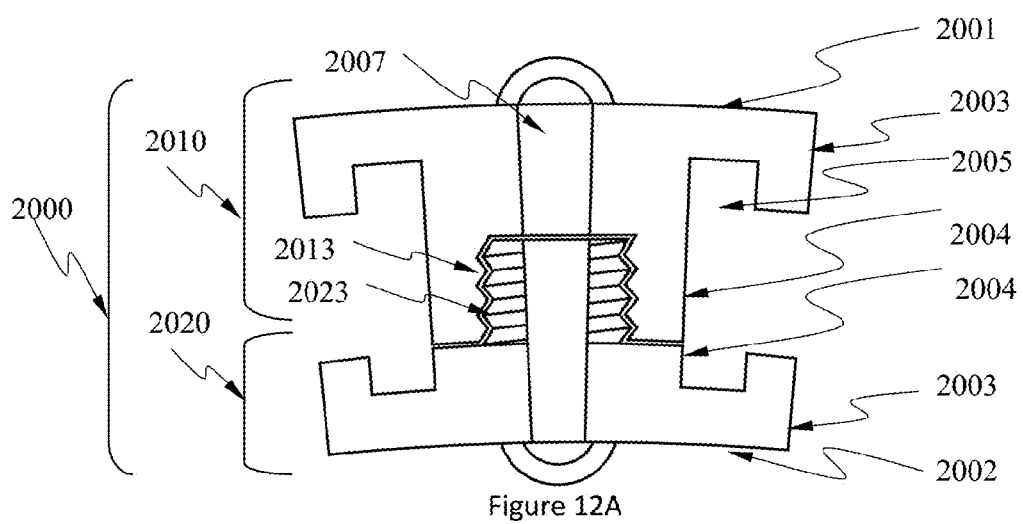
FIG. 12A is a cross-sectional view of a connector according to an embodiment.
Figure 12B:
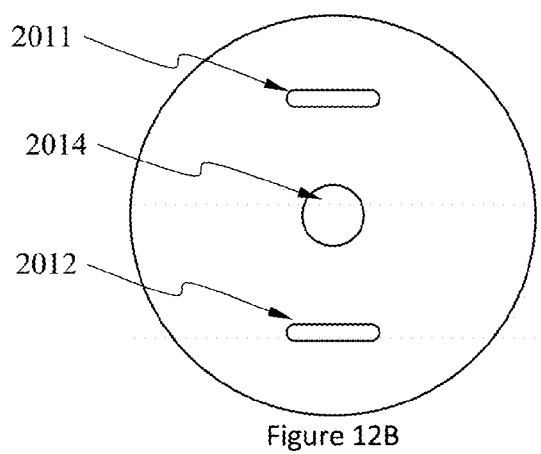
FIG. 12B is a top view of the connector in FIG. 12A according to an embodiment.
Figure 12C:
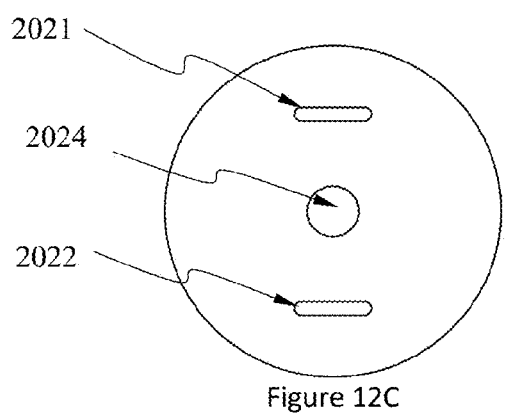
FIG. 12C is a bottom view of the connector in FIG. 12A according to an embodiment.

According to an embodiment as shown in FIGS. 12B and 12C, the top connector piece 2010 further comprises a first top handle 2011 and a second top handle 2012; the bottom connector piece 2020 further comprises a first bottom handle 2021 and a second bottom handle 2022.

According to an embodiment, the first top handle and second top handle are configured to facilitate the installation of the top connector piece. The first top handle or the second top handle may also be configured to accept a wiring, a hook, an additional attachable element, etc., therethrough.

According to an embodiment, the first bottom handle and second bottom handle are configured to facilitate the installation of the bottom connector piece. The first bottom handle or the second bottom handle may also be configured to accept a wiring, a hook, or an additional attachable element, etc., therethrough.

According to an embodiment as shown in FIGS. 12A and 14, the top connector piece 2010 comprises an internal thread 2013; the bottom connector piece comprises an external thread 2023. The top connector piece 2010 and the bottom connector piece 2020 are configured to be securely joined by the internal thread 2013 and the external thread 2023.

According to an embodiment as shown in FIGS. 12 and 14, the top connector piece 2010 comprises a top through hole 2014 in a center of the top connector piece 2010; the bottom connector piece 2020 comprises a bottom through hole 2024 in a center of the bottom connector piece. The top through hole 2014 and the bottom through hole 2024 are configured to align to form a holding space 2007.

According to an embodiment the holding space 2007 has an opening on the upper wall and an opening on the lower wall.

According to an embodiment, the structure further comprise additional elements such as a control system, a power cable or system, a security system, an energy generation system, a heating system, a communication cable or system, a transmission cable or system, a food or water transit cable or system, a display or notification system, an alarm system, a speaker system, a battery system, an air conditioning system, a filtration system, a lighting system, or a device or a material that is adapted to provide for life and survival in a disaster situation such as tornadoes, hurricanes, or earthquakes.

According to an embodiment such additional elements may be accommodated in the holding space 2007.

Figure 13A:
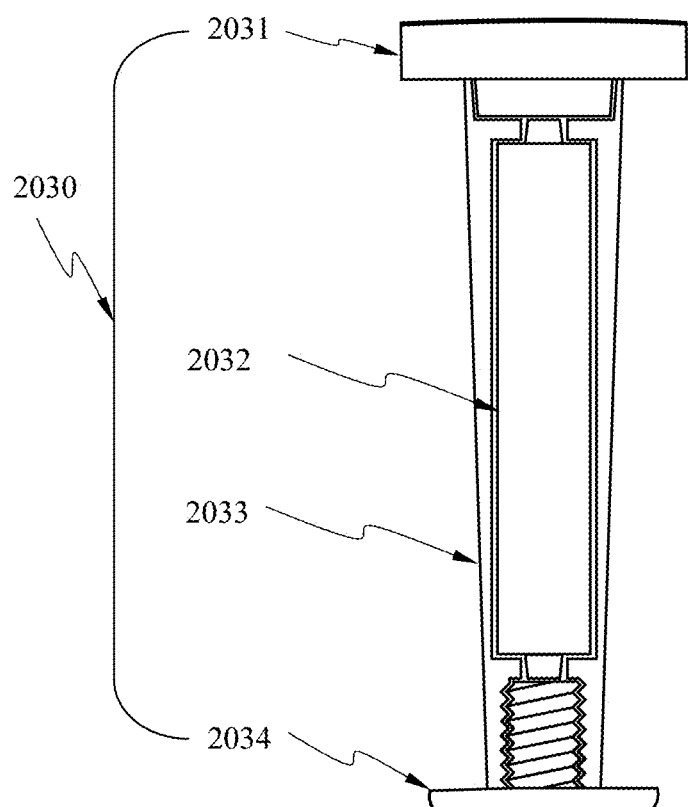
FIG. 13A is a side view of a lighting device according to an embodiment.
Figure 13B:
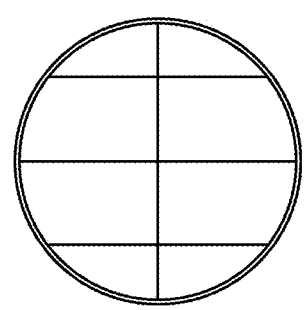
FIG. 13B is a top view of the lighting device in FIG. 13A according to an embodiment.
Figure 13C:
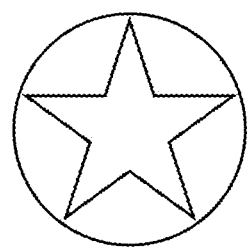
FIG. 13C is a bottom view of the lighting device in FIG. 13A according to an embodiment.

According to an embodiment as shown in FIGS. 12-13, the structure further comprise a lighting device in the holding space.

According to an embodiment as shown in FIG. 13, the lighting device 2030 comprises a solar panel 2031, a battery 2032, a casing 2033 that is configured to be secured within the holding space, and a LED light 2034.

According to an embodiment, the solar panel has a diameter larger than the diameter of the opening of the top through hole 2014 on the upper wall. The casing has a diameter smaller than the diameter of the opening of the top through hole 2014 on the upper wall. The solar panel and the casing is configured to be pre-assembled together and installed from the top through hole.

According to an embodiment, the solar panel is oriented at a direction toward the exterior of the dome, so as to collect solar energy from sunlight received by the exterior surface of the dome.

According to an embodiment, as shown in FIG. 13, the solar panel 2031 comprises an array of panels.

According to an embodiment, the LED light has a diameter larger than the diameter of the opening of the bottom through hole 2024 on the lower wall. The LED light is configured to be pre-assembled. The battery and the LED light are configured to be installed from the bottom through hole. The LED light, the battery, the solar panel and the casing are configured to be securely connected together by fasteners such as screws.

According to an embodiment, the LED light is oriented at a direction toward the interior of the dome, so as to provide lighting to the interior of the dome.

According to an embodiment, the color and patterns on the LED lights are variable. According to an embodiment as shown in FIG. 13, one of the patterns on the LED lights is in star shapes.

According to an embodiment, an apparatus comprises said connector.

According to an embodiment, the apparatus is a toy, a game, a model or a tool.

According to an embodiment, preferably, the structure further comprises a first plurality of spherical triangular units, each of which is essentially identical to the first spherical triangular unit; the second spherical triangular unit is essentially identical to the first spherical triangular unit; wherein the first plurality of spherical triangular units and the first and second spherical triangular units are essentially equally spaced radially along the third great circle, and constitute a first level of the structure.

According to an embodiment, preferably, the structure further comprises a second plurality of spherical triangular units, each of which is essentially identical to the third spherical triangular unit; wherein the second plurality of spherical triangular units and the third spherical triangular unit are essentially equally spaced radially relative to a center of the sphere, and constitute a second level of the structure.

According to an embodiment, preferably, the structure further comprises a plurality of spherical triangular units; the plurality of spherical triangular units on one level of the plurality of levels are essentially identical to each other, and are essentially equally spaced radially relative to a center of the sphere; each of the plurality of spherical triangular units located on a level above the first level comprises three planar panels, each with an end surface comprising a minor arc of a great circle of the sphere; a spherical triangular unit on a level above the first level of the structure is configured to be joined with two neighboring spherical triangular units on the level below; the structure is substantially a dome.

The structure may further comprise a foundation of concrete and reinforced steel bars, for providing security and strength.

According to an embodiment, one spherical triangular unit on the first level of the structure is interconnected with a neighboring spherical triangular unit on the first level and with the foundation of the structure by an outer plate, an inner plate, one or more fasteners and bolts.

The structure may further comprise windows and entryways. Windows may be designed to fit within an intra-unit or an inter-unit opening of the spherical triangular units, or may be designed as a skylight at the top of the structure. Entryways may be designed as a cut out of the structure.

The structure of this disclosure has a superior ability to survive disasters such as tornadoes, hurricanes, earthquakes etc. It is cost-efficient, energy efficient, extremely durable and easily maintained. It is also easy to assemble from prefabricated parts. The structure can be constructed on virtually any site such as in the mountains, on beaches, even underground or underwater without requiring large and heavy construction equipments. The structure, when properly designed with considerations of the need of its users, may be adapted as homes, offices, schools, churches, storages, emergency shelters and so on.

In relation to the claims, it is intended that when words such as "a," "an," "at least one," or "at least one portion" are used to preface a feature there is no intention to limit the claim to only one such feature unless specifically stated to the contrary in the claim.

The descriptions above are intended to be illustrative, not limiting. Thus, it will be apparent to one skilled in the art that modifications may be made without departing from the scope of the claims set out below.

What is claimed is:

1. A connector, comprising an upper wall, a lower wall, one or more outer circular walls and one or more inner circular walls; wherein one of the one or more outer circular walls is an extended part of the upper wall or the lower wall and has a vertical extension forming a full circular wall; wherein one of the one or more outer circular walls and one of the one or more inner circular walls are configured to form a circular slot between the vertical extension of the outer circular wall and the inner circular wall; wherein the circular slot is within the vertical extension of the outer circular wall; wherein the connector is configured to accommodate a plurality of ends of a plurality of planar panels in the circular slot to connect the plurality of planar panels;

further comprising a top connector piece and a bottom connector piece; wherein the top connector piece comprises the upper wall and one of the one or more inner circular walls; wherein the bottom connector piece comprises the lower wall and one of the one or more inner circular walls; wherein the top connector piece and the bottom connector piece are configured to be joined;

wherein the top connector piece comprises a top through hole in a center of the top connector piece; wherein the bottom connector piece comprises a bottom through hole in a center of the bottom connector piece; wherein the top through hole and the bottom through hole are aligned to form a holding space;

further comprising a lighting device in the holding space; wherein the lighting device comprises a solar panel, a battery, a casing, and a LED light.

2. The connector of claim 1, wherein the top connector piece further comprises a first top handle and a second top handle; wherein the bottom connector piece further comprises a first bottom handle and a second bottom handle.

3. The connector of claim 1, wherein the one or more outer circular walls are in cylindrical shapes.

4. The connector of claim 1, wherein the one or more outer circular walls are in conical or funnel shapes.

5. The connector of claim 1, wherein the top connector piece comprises an internal thread; the bottom connector piece comprises an external thread; wherein the top connector piece and the bottom connector piece are joined by the internal thread and the external thread.

* * * * *